(12) United States Patent  
Adra (10) Patent No.: US 7,400,071 B2
(45) Date of Patent: Jul. 15, 2008

(54) SELECTIVELY CONFIGURABLE ELECTRIC MOTOR

(75) Inventor: Rodwan Tarek Adra, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 188 days.

(21) Appl. No.: 11/238,036

(22) Filed: Sep. 29, 2005

(65) Prior Publication Data

US 2007/0069667 A1 Mar. 29, 2007

(51) Int. Cl.
*H02K 11/00* (2006.01)

(52) U.S. Cl. .................... 310/68 B; 310/68 R
(58) Field of Classification Search ........... 310/68 B, 310/68 R, 166, 254, 261; 318/254, 701
See application file for complete search history.

(56) References Cited

U.S. PATENT DOCUMENTS

| | | | |
|---|---|---|---|
| 5,084,662 A | | 1/1992 | Palaniappan et al. |
| 5,304,882 A | * | 4/1994 | Lipo et al. ............. 310/156.53 |
| 5,459,385 A | * | 10/1995 | Lipo et al. ................. 318/701 |
| 5,545,938 A | * | 8/1996 | Mecrow ................ 310/156.64 |
| 5,883,485 A | | 3/1999 | Mehlhorn |
| 5,929,590 A | | 7/1999 | Tang |
| 5,939,854 A | | 8/1999 | Pyo |
| 6,037,740 A | | 3/2000 | Pollock et al. |
| 2002/0024316 A1 | | 2/2002 | Honma et al. |
| 2004/0075413 A1 | | 4/2004 | Biebach |
| 2004/0217668 A1 | | 11/2004 | Antonopoulos et al. |
| 2005/0035676 A1 | | 2/2005 | Rahman et al. |
| 2005/0062452 A1 | | 3/2005 | Mir et al. |
| 2005/0146304 A1 | | 7/2005 | Ramu |
| 2005/0151491 A1 | | 7/2005 | Nakai et al. |

FOREIGN PATENT DOCUMENTS

| | | |
|---|---|---|
| DE | 199 17 419 | 10/2000 |
| EP | 0181938 | 5/1986 |
| EP | 1717947 A2 | 11/2006 |
| JP | 2004-222383 | 8/2004 |
| WO | WO 01/15309 A1 | 3/2001 |

* cited by examiner

*Primary Examiner*—Thanh Lam
(74) *Attorney, Agent, or Firm*—Finnegan, Henderson, Farabow, Garrett & Dunner (57) ABSTRACT

A selectively configurable electric motor comprises a stator and a plurality of poles electrically coupled to the stator. The selectively configurable electric motor also includes an actuator separated from the poles by an air gap and configured to move relative to the stator in the presence of an electromagnetic field. The selectively configurable electric motor further includes a plurality of electric conductors, each of the plurality of electric conductors substantially wound around one of the plurality of poles. The selectively configurable electric motor also includes a power converter, at least a portion of which is coupled to the plurality of electric conductors, including a plurality of switching elements configured to selectively couple one or more of the plurality of electric conductors in a predetermined electrical configuration.

10 Claims, 6 Drawing Sheets

FIG. 6 ized coils. These additional conductors may generate additional heat in the coils, create multiple high voltage potential points with the stator conductor, and/or otherwise unpredictably alter the operation of the coils that could increase the likelihood of premature coil conductor damage and/or inefficient operation of the motor. Furthermore, in multi-phase machines, tap locations must be located in the same relative position on each phase coil to ensure that the inductance reduction (and associated current flow) will be identical between the phases. Designing and locating identical and repeatable tap locations for each coil within the motor may substantially limit motor design flexibility.

SELECTIVELY CONFIGURABLE ELECTRIC MOTOR

TECHNICAL FIELD

This application relates generally to an electric motor and, more particularly, to a selectively configurable electric motor for a work machine.

BACKGROUND

Work machines such as, for example, wheel loaders, motor graders, track-type tractors, dump trucks, and other types of machinery are used to perform a variety of tasks associated with an industry such as, mining, construction, manufacturing, transportation, or any other such industry. Generally, work machines include a power source such as, for example, a diesel engine, a gasoline engine, a natural gas engine, or any other type of power source that provides power required to complete these tasks. To efficiently perform these tasks, the work machine may utilize a transmission that is capable of transmitting energy produced by the power source, in the form of torque, over a wide range of speeds. In some work machines, the transmission may include a generator coupled to the power source to provide an electrical power output for one or more electric motors. The motors may be connected to ground engaging traction devices to propel the work machine.

The electric motors coupled to the traction devices may include, for example, switched reluctance (or variable reluctance) motors. While these types of motors may provide the variable speed capability required to effectively propel a mobile machine, torque output over the broad range of speeds may be limited. For example, for a series wound switched reluctance motor, torque output at low speeds is typically very high and nearly constant. However, as rotor speed increases, the high current required to maintain the electromagnetic force necessary to maintain constant torque output cannot be provided, due to the electrical time constraints of the charging and discharging of the phase coils. Thus, it may be advantageous to provide a system to allow additional current flow through the phase coils at higher speed to provide a constant torque output over a wider range of speeds.

One method to maintain the torque output of a switched reluctance motor is described in Published U.S. patent application No. 2004/0217668 (hereinafter referred to as the '668 publication), which discloses a switched reluctance electrical machine including a salient pole stator, a salient pole carrier configured to move relative to the stator, and a plurality of coils. Each coil includes a "tap" to alter the effective number of turns in the coil, based on the speed of the rotor. The tap reduces the inductance of the turns in the coil to supply "high speed peak current" to the coils at high speed. Additional taps may be included to extend the range of speed while maintaining constant power output.

Although the system of the '668 publication maintains a constant power output over a range of machine speeds, it may be unreliable. For example, the system of the '668 publication relies on an electrical "tapping" of the coils of the electric motor, which requires additional conductors in close proximity with energized coils. These additional conductors may generate additional heat in the coils, create multiple high voltage potential points with the stator conductor, and/or otherwise unpredictably alter the operation of the coils that could increase the likelihood of premature coil conductor damage and/or inefficient operation of the motor. Furthermore, in multi-phase machines, tap locations must be located in the same relative position on each phase coil to ensure that the inductance reduction (and associated current flow) will be identical between the phases. Designing and locating identical and repeatable tap locations for each coil within the motor may substantially limit motor design flexibility.

In addition, because the electric motor of the '668 publication requires physical taps, manufacturing costs may be expensive. For example, tapping of the phase coils during manufacture of the machine may require additional time, personnel, and/or material resources to precisely position the tap locations, to properly wind the conductors with respect to the tap locations, and to ensure that all "tapped" locations are accessible by maintenance personnel. This cumbersome manufacturing process may substantially increase motor manufacturing and design costs.

Finally, the electric motor described in the '668 publication may be extremely difficult to repair and/or maintain. For example, should one or more of the tap conductors require replacement (or if additional taps need to be made), the phase coil must be unwound and/or replaced, which may require substantial technical knowledge. Furthermore, isolating a problematic tap could require substantial testing, potentially rendering the electric motor inoperable (and unproductive) for prolonged periods.

The presently disclosed electric motor is directed to overcoming one or more of the problems set forth above.

SUMMARY OF THE INVENTION

In accordance with one aspect, the present disclosure is directed toward a selectively configurable electric motor. The selectively configurable electric motor may include a stator and a plurality of poles electrically coupled to the stator. The selectively configurable electric motor may also include an actuator separated from the poles by an air gap and configured to move relative to the stator in the presence of an electromagnetic field. The selectively configurable electric motor may further include a plurality of electric conductors, each of the plurality of electric conductors substantially wound around one of the plurality of poles. The selectively configurable electric motor may also include a power converter, at least a portion of which is coupled to the plurality of electric conductors, including a plurality of switching elements configured to selectively couple one or more of the plurality of electric conductors in a predetermined electrical configuration.

According to another aspect, the present disclosure is directed toward a method for increasing the torque output range of an electric motor. The method may include energizing a plurality of field coils of the electric motor to operate the motor at a predetermined speed. The method may also include determining a desired output torque of the electric motor. The method may further include selecting an electrical configuration of a plurality of field coils of the electric motor based on the desired output torque.

In accordance with another aspect, the present disclosure is directed toward a work machine. The work machine may include a power source configured to provide a power output. The work machine may also include a generator operatively coupled to the power source to convert at least a portion of the power output to electric energy. The work machine may further include a selectively configurable electric motor coupled to the generator, configured to receive at least a portion of the electric energy, the electric motor including a stator, a plurality of poles electrically coupled to the stator, a rotor separated from the poles by an air gap and configured to move relative to the stator in the presence of an electromagnetic field, a plurality of electric conductors, each of the plurality of electric conductors substantially wound around one of the plurality of poles. The selectively configurable electric motor of the work machine may further include a power converter, at least a portion of which is coupled to the plurality of electric conductors, comprising a plurality of switching elements configured to selectively couple one or more of the plurality of electric conductors in a predetermined electrical configuration.

DETAILED DESCRIPTION

Figure 1:
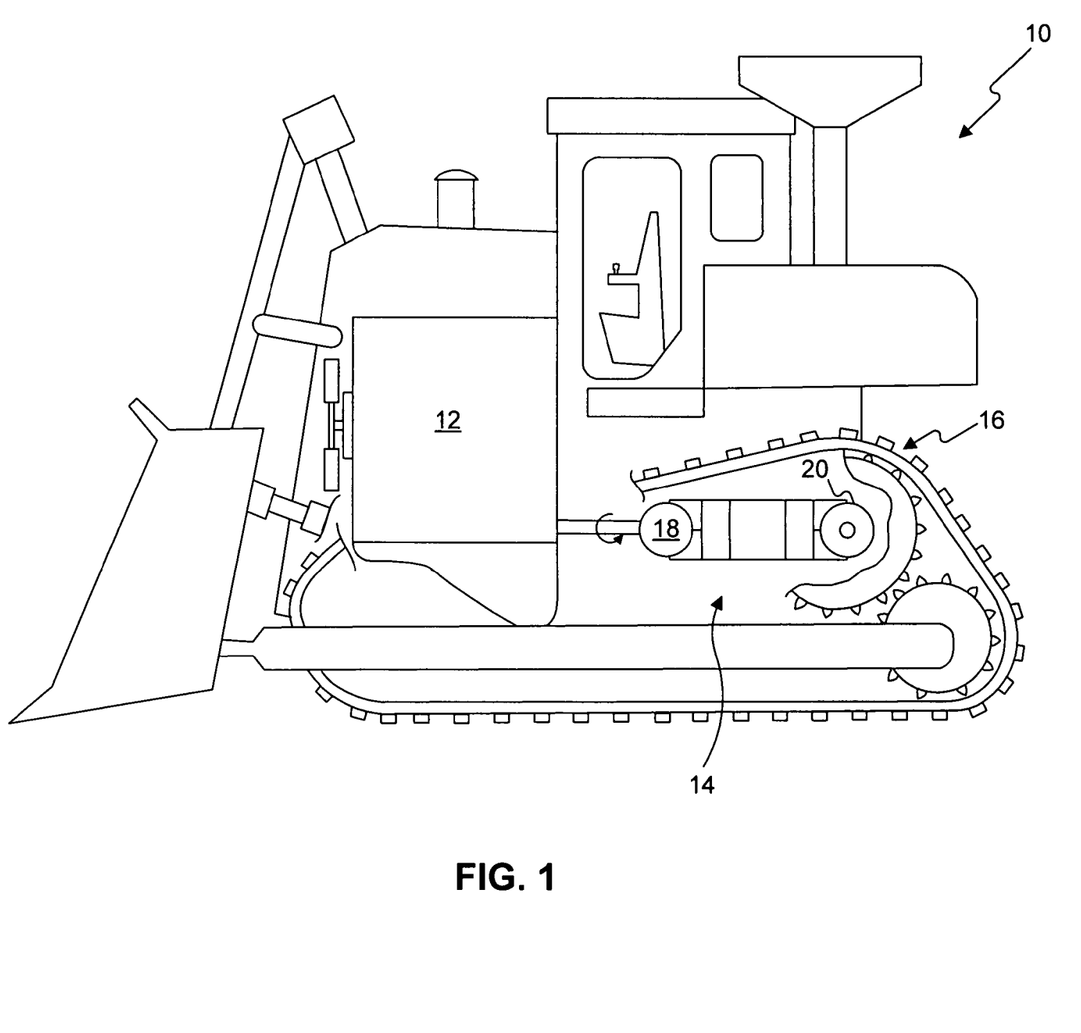
FIG. 1 provides a diagrammatic illustration of an exemplary disclosed work machine.

FIG. 1 illustrates an exemplary disclosed work machine 10 having a plurality of components that cooperate to perform some type of task associated with an industry such as mining, construction, agriculture, transportation, manufacturing, or any other industry. While work machine 10 is illustrated as a track type tractor, work machine 10 may include any type of work machine having one or more systems operable to perform a particular function. For example, work machine 10 may include an on-highway vehicle, an off-highway vehicle, a wheel loader, an excavator, a skid steer loader, a generator set, or any other type of machinery. Work machine 10 may include, among other things, a power source 12, a transmission 14, one or more traction devices 16, a generator 18, and a selectively configurable electric motor 20. It is contemplated that work machine 10 may include additional and/or different components than those listed above.

Power source 12 may include various components configured to output energy for use by work machine 10. For example, power source 12 may include an internal combustion engine that operates on diesel fuel, gasoline, natural gas, or any type of fuel. Alternatively, power source 12 may include any type of device configured to output mechanical and/or electrical energy such as, for example, a fuel cell, a battery, a turbine, an alternator, a transformer, or any other appropriate power output device.

Transmission 14 includes components that cooperate to efficiently transmit energy from power source 12 to one or more mechanical devices that may be operable to move work machine 10. For example, transmission 14 may be operatively coupled to one or more traction devices 16 to propel work machine 10. Transmission 14 may include a torque converter (not shown) for adjusting output torque from power source 12, a cooling circuit (not shown) for cooling and/or lubricating transmission 14, a transmission controller for controlling the operation of transmission 14, or any other such device for transmitting energy to a mechanical device. Although transmission 14 is illustrated as an electric transmission, it is contemplated that transmission 14 may include a hydrostatic transmission, a mechanical transmission, a hydro-mechanical transmission, or any other means for transmitting power from power source 14.

Generator 18 may be operatively coupled to power source 12 and may be configured to convert at least a portion of a power output of power source 12 to electrical energy. For example, generator 18 may include an alternator for an on-highway work machine that may be coupled to power source 12 to produce electrical power output to drive selectively configurable electric motor 20 associated with the work machine. Generator 18 may be configured to produce a direct current (DC) output or an alternating current (AC) output. It is also contemplated that AC or DC outputs may be converted with the use of a power converter to produce a variety of current and/or voltage outputs for use by various components of work machine 10.

Selectively configurable electric motor 20 may be operatively coupled to generator 18 and configured to provide mechanical force for performing a task associated with work machine 10. Selectively configurable electric motor 20 may receive electrical energy from generator 18 to produce torque output for performing work. For example, selectively configurable electric motor 20 may be coupled to traction devices 16 and configured to provide output torque to a shaft to move traction devices 16 to propel work machine 10. Although selectively configurable electric motor 20 is illustrated as a drive for one or more traction devices 16, it is contemplated that selectively configurable electric motor 20 may be used in any application of work machine 10 that may require mechanical energy to operate.

Figure 2:
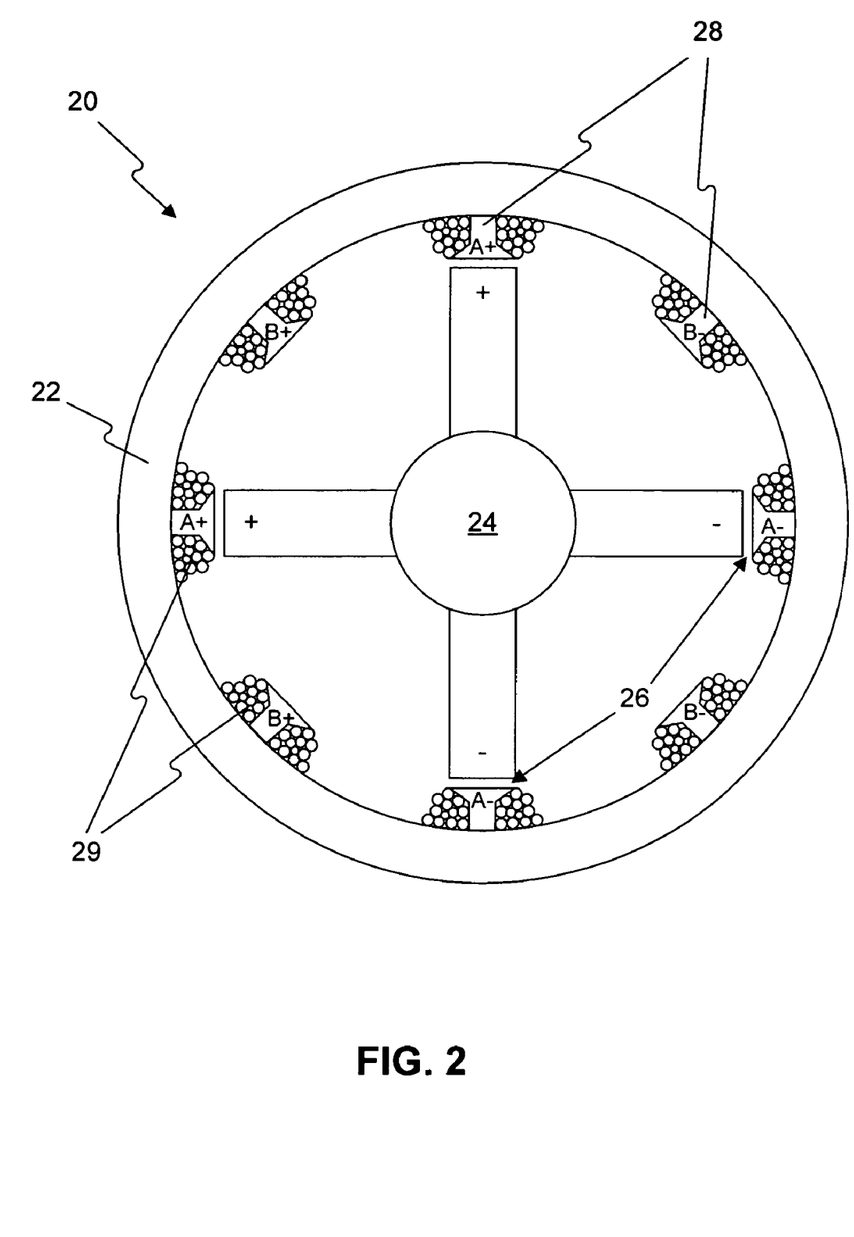
FIG. 2 provides a diagrammatic illustration of an exemplary disclosed selectively configurable electric motor.

As illustrated in FIG. 2, selectively configurable electric motor 20 may include a stator 22 electromagnetically coupled to an actuator 24 and separated by an air gap 26 over which an electromagnetic field is induced. Selectively configurable electric motor 20 may also include electric conductors 29 substantially wound around poles 28 for supplying electrical energy to induce an electromagnetic field between stator 22 and actuator 24. Selectively configurable electric motor 20 is a switched reluctance motor It is also contemplated that selectively configurable electric motor 20 may include any appropriate type of motor for providing mechanical energy output, such as a linear motor, a stepper motor, or any other type of motor that is operated with unidirectional current flow within the coils of the motor.

Stator 22 may include a high magnetic permeability metallic core such as, for example, iron, cobalt, nickel, or any other high permeability metal or alloy thereof, configured to promote a magnetic flux proportional to a magnetizing current. For example, stator 22 may include an iron core of particular size, shape, and dimension so as to maximize the magnetic flux density given the size and configuration of actuator 24. Although stator 22 is illustrated as a substantially circular stator for use with a rotor, it is contemplated that stator 22 may include a linear stator for use with a linear motive bar, as in, for example, a linear motor or as a platter configuration as used in an axial flux designed motor.

Actuator 24 may include a metallic core operatively coupled to stator 22 and configured to move relative to stator 22 in the presence of a magnetic field. For example, as illustrated in FIG. 2, actuator 24 may include a substantially round core disposed within stator 22 and configured to rotate within stator 22 in the presence of a generated electromagnetic field.

Although actuator 24 is illustrated as a rotor in one exemplary embodiment, actuator 24 may include a metallic beam configured to move linearly with respect to stator 22, as in a linear motor. Actuator 24 may include high magnetic permeability metallic structure such as, for example, iron, cobalt, nickel, or any other such type of appropriate material.

Poles 28 may include salient metallic structures that may protrude from stator 22 to provide a highly concentrated magnetic flux density to provide greater electromagnetic interaction with actuator 24. Poles 22 may be constructed of a high relative permeability metal such as, for example, iron, cobalt, nickel, or any other such material. The number of poles 28 may be selected based on the desired speed and torque relationship depending upon the prospective use of the motor during the design stages. Although selectively configurable electric motor 20 is illustrated as an eight pole machine, it is contemplated that more or less poles may be provided depending on the desired performance of selectively configurable electric motor 20.

Electric conductors 29 may include one or more wires associated with poles 28 and configured to induce a magnetic flux within poles 28. Electric conductors 29 may be constructed of any material that has a substantially high conductivity such as copper, iron, steel, aluminum, or any other suitable material for conducting current. Further electric conductors may be substantially wound around poles 28 to maximize the current-induced magnetic flux within poles 28.

Electric conductors 29 may be arranged in phases such that, when electric conductors 29 are energized, the magnetic flux generated within poles 28 cooperate to provide maximum rotational force on actuator 24. For example, in one embodiment, phases may be arranged such that electric conductors 29 associated with pairs of poles 28 that are diametrically opposed induce a uniform, symmetric magnetic field to move actuator 24. Although selectively configurable electric motor 20 is illustrated as a symmetric motor, it is contemplated that asymmetric configurations may be realized with electric conductors 29 arranged to provide a uniform magnetic field for moving actuator 24.

Each of electric conductors 29 may be associated with one of poles 28 and configured such that each of electric conductors 29 may be operated independently of the others. For example, a first electric conductor 29 may be associated with a first pole 28 of a first phase of selectively configurable electric motor 20, while a second electric conductor 29 may be associated with a second pole of a first phase of selectively configurable electric motor 20. First and second electric conductors, although associated with a single phase, may be separately operated and/or configured.

Figure 3A:
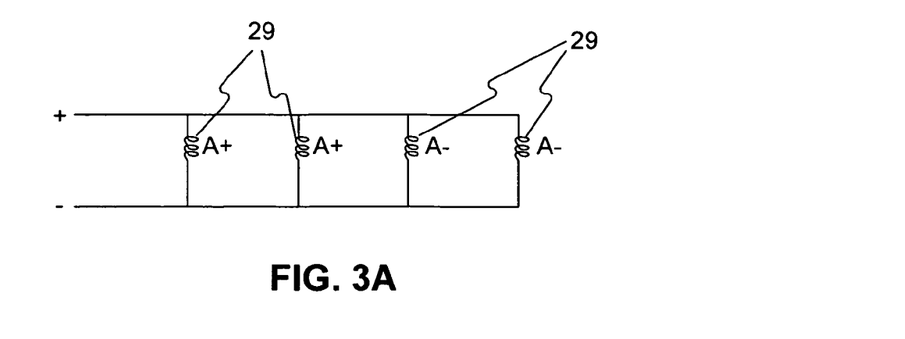
FIG. 3a provides a schematic illustration of an exemplary disclosed parallel arrangement of field conductors.
Figure 3B:
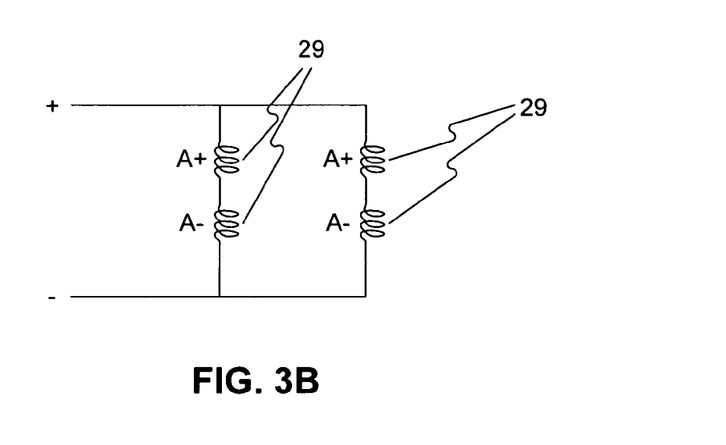
FIG. 3b provides a schematic illustration of an exemplary disclosed combination series/parallel arrangement of field conductors.
Figure 3C:
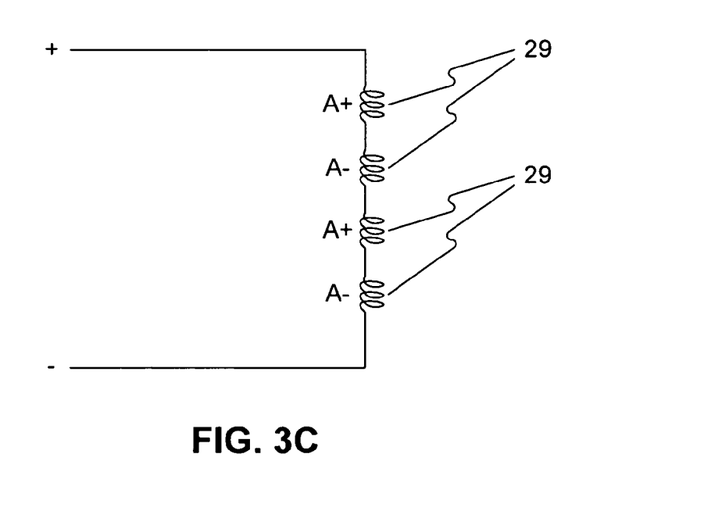
FIG. 3c provides a schematic illustration of an exemplary disclosed series arrangement of field conductors.

As illustrated in FIGS. 3a-c, electric conductors 29 associated with a single phase of selectively configurable electric motor 20 may be arranged in various electric configurations, depending on the desired operation of selectively configurable electric motor. For example, electric conductors 29 associated with a first phase of selectively configurable electric motor 20 may be arranged in a parallel configuration, as shown in FIG. 3a, a combination series/parallel configuration, one of which is illustrated in FIG. 3b, or a series configuration, as illustrated in FIG. 3c. Although the exemplary configurations illustrated in FIGS. 3a-3c include four electric conductors 29 (associated with the 8-pole/2-phase motor illustrated in FIG. 2), it is contemplated that more or fewer electric conductors may be associated with a phase of selectively configurable electric motor 20, depending on the desired configuration and/or operational characteristics of the motor.

Figure 4A:
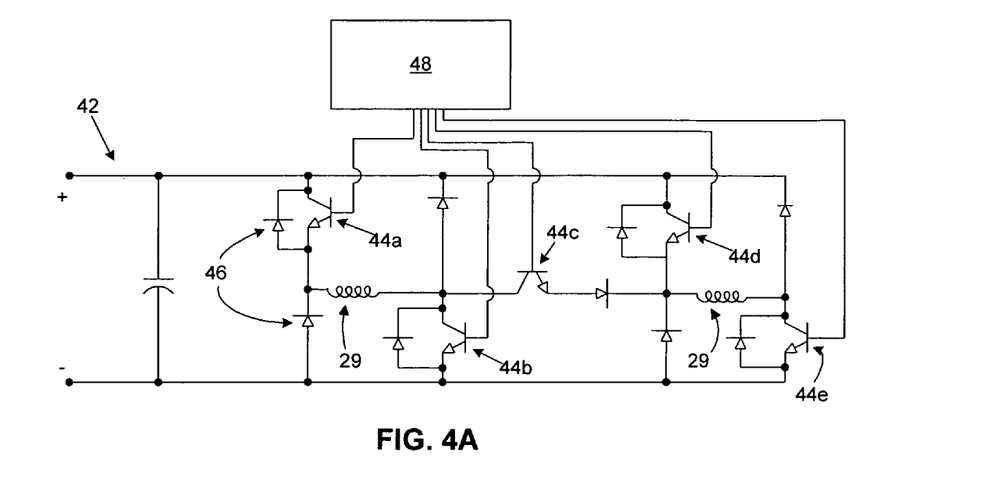
FIG. 4a provides a schematic circuit diagram of an exemplary disclosed power converter.
Figure 4B:
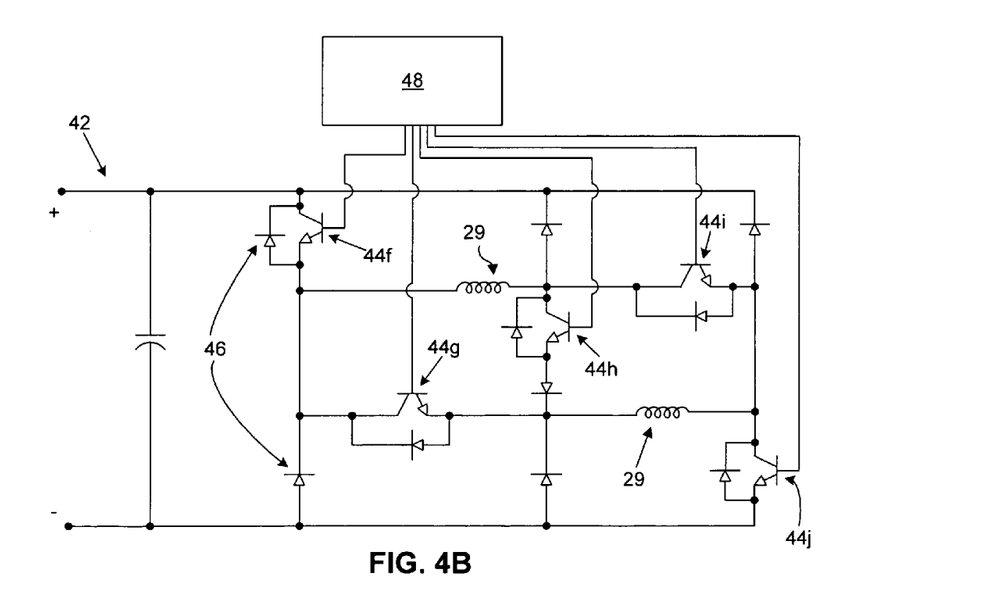
FIG. 4b provides a schematic circuit diagram of an alternative exemplary disclosed power converter.

FIGS. 4a and 4b illustrate exemplary disclosed configurations of power converter 42. Power converter 42 may be operatively coupled to one or more electric conductors 29 and may include one or more components that cooperate to energize electric conductors 29. For example, power converter 42 may include one or more of switching elements 44a-j and diodes 46 to provide selectable electric current flow paths to electric conductors 29, and may be coupled to one or more electric conductors 29 based on the number of phases associated with selectively configurable electric motor 20. Although FIGS. 4a and 4b show two electric conductors 29, it is contemplated that additional field conductors may be coupled to power converter 42 by cascading the circuit of FIG. 4a or 4b based on the number of electric conductors 29 associated with a single phase.

Switching elements 44a-j may include one or more electrical devices configured to selectively provide one or more current flow paths to portions of power converter 42. For example, each of switching elements 44a-j may include two operational states. A first operational state provides a substantially short circuit condition to provide a current flow path (i.e., an "on" state), while a second operational state provides a substantially open circuit condition to prevent current flow (i.e., an "off" state). Switching elements 44a-j may include any electrical device adapted to act as an electric switch such as, for example, an insulated gate bipolar transistor, a CMOS implemented switch, a MOSFET transistor, a bipolar junction transistor, or any other such electric switching device.

Diodes 46 may be arranged to provide unidirectional current flow to generator 18 to allow dissipation of excess current back to the generator 18. For example, because electric conductors 29 may include current storing devices, any excess current stored in electric conductors 29 must be safely extracted from power converter 42 to ensure that residual current through the windings does not unpredictably interfere with the movement of actuator 24.

A controller 48 may be operatively coupled to power converter 42 and configured to operate one or more switching devices 44a-j based on a desired operation of selectively configurable electric motor 20. For example, controller 48 may selectively operate one or more switching devices to provide an alternate configuration of electric conductors 29 in response to a desired torque output. In one embodiment, controller 48 may be coupled to the gate of an insulated gate bipolar transistor to modify the gate bias current to open and close the current flow path through the transistor. It is also contemplated that controller 48 may include timing circuitry to control the timing of power converter 42 or one or more switching elements 44a-j of power converter 42.

Controller 48 may be operatively coupled to one or more sensor elements (not shown) configured to monitor the operational characteristics of selectively configurable electric motor 20. For example, controller 28 may be coupled to a temperature sensor, a velocity sensor, an ammeter, a position sensor, and/or any other type of sensor. Controller 48 may monitor one or more operational characteristics of selectively configurable electric motor 20 such as, for example, an actuator (e.g., rotor) speed, an electric conductor current, a temperature associated with a portion of selectively configurable electric motor, a torque generated by actuator 24, or any other such operational characteristic of selectively configurable electric motor 20.

Controller 48 may include various components (not shown) for running software applications, and may be configured to store, receive, transmit, and analyze data information by executing software applications stored in computer-readable memory. For example, controller 48 may include a central processing unit (CPU), a computer-readable memory, a read only memory (ROM), a random access memory (RAM), input/output (I/O) elements, etc.

CPU (not shown) associated with controller 48 may be configured to execute one or more software applications stored in computer readable memory to analyze operational data supplied by sensor elements and associated with selectively configurable electric motor 20. For example, controller 28 may receive electric current data associated with electric conductors 29 and speed and position data associated with actuator 24 from one or more sensor elements. Using the received data, controller 48 may determine an actual torque output provided by selectively configurable electric motor 20.

As illustrated in FIG. 4a power converter 42 may be operated to selectively configure electric conductors 29 of the motor. For example, one or more switching elements 44a-e associated with power converter 42 may be operated to functionally arrange electric conductors 29 associated with a phase winding of selectively configurable electric motor 20 in a parallel or series configuration based on a desired operational aspect. In one exemplary embodiment, power converter 42 may include one or more operational states, a series state and a parallel state.

For series-state operation, switching elements 44a, 44c, and 44e are "on" (i.e., short circuit operation), while switching elements 44b and 44d are "off" (i.e., open circuit operation). The resulting equivalent circuit results in a series arrangement of electric conductors 29. During series operation, the maximum current flow is provided through each coil, which may result in high torque output at relatively low speeds. However, as actuator speed is increased, the increased inductance resulting from the series configuration may not provide ample time to allow the current necessary to maintain torque output.

In situations where torque output is desired at increased actuator speed, parallel-state operation may be provided. In these situations, controller 48 may place switches 44a, 44b, 44d, and 44e "on", and place switch 44c "off". As a result, electric conductors 29 are arranged in parallel, reducing the inductance of the overall phase winding, allowing current to build in electric conductors 29 more quickly, to provide greater actuator speed without compromising torque output.

In an alternative embodiment and as illustrated in FIG. 4b, the arrangement of the switching elements 44, diodes 46, and electric conductors may be modified to provide alternate circuit implementations with substantially the same function. For example, series-state operation of the embodiment in FIG. 4b may be realized by operating switching elements 44f, 44h, and 44j in the "on" state, while placing switching elements 44g and 44i in the "off" state. The resulting equivalent circuit places electric conductors 29 in a series configuration. As in the embodiment illustrated in FIG. 4a, the series configuration may provide maximum torque output for relatively low actuator speed.

Similarly, speed may be increased without substantially compromising torque output by placing electric conductors 29 in parallel-state operation. For example, controller 48 may operate switching elements 44f, 44g, 44i, and 44j in the "on" state, while placing switching element 44h in the "off" state. The resulting arrangement may place electric conductors 29 in a parallel arrangement, which may thereby result in a lower inductance associated with the phase winding, allowing for faster actuator speed while maintaining torque output.

Although illustrated in certain embodiments as a four pole, two-phase motor, it is contemplated that selectively configurable electric motor 20 may include additional poles and/or phases, by cascading the phase winding schematics shown in FIGS. 4a and 4b, either in series or in parallel, depending upon the desired motor operability.

INDUSTRIAL APPLICABILITY

The disclosed selectively configurable electric motor may be applicable to any work machine environment in which it may be desirable to provide torque output over a wide range of speeds. Specifically, the disclosed selectively configurable electric motor may provide a relatively constant torque output independent of motor speed, without necessitating mechanical modification of the field windings of a motor. An illustrative method for increasing the torque output range of an electric motor will now be described.

Figure 5:
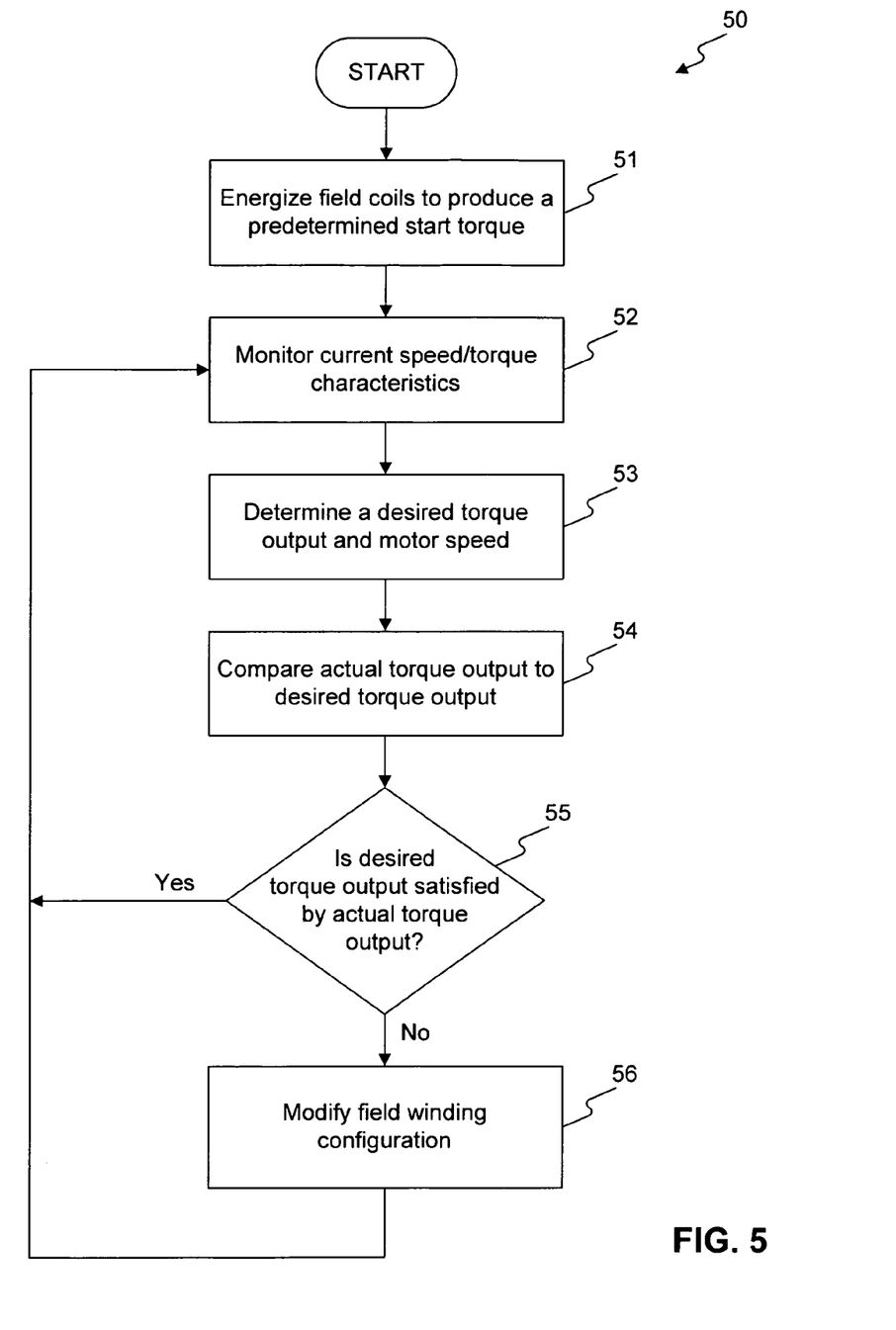
FIG. 5 illustrates an exemplary disclosed method for increasing the torque output range of an electric motor.

As illustrated in flowchart 50 of FIG. 5, operation of selectively configurable electric motor 20 may be initiated by energizing electric conductors 29 to produce a predetermined starting torque (Step 51). For example, power converter 42 of selectively configurable electric motor 20 may be configured to energize electric conductors 19 to operate selectively configurable electric motor 20 at an initial rotational speed of 2500 rpm. Upon startup of selectively configurable electric motor 20, the speed and/or torque output may be adapted based on a desired task or function associated with work machine 10.

Upon startup of selectively configurable electric motor 20, actual speed and/or torque characteristics associated with the operation of selectively configurable electric motor 20 may be monitored (Step 52). For example, one or more sensor elements coupled to controller 48 may monitor one or more operational aspects of selectively configurable electric motor 20 and provide the monitored data to controller 48. Controller 48 may determine the actual speed and torque characteristics associated with the operation of selectively configurable electric motor 20.

Once the actual speed and/or torque output has been determined, a desired speed and/or torque output at a particular speed is determined (Step 53). The desired torque output at a particular speed may be determined using a variety of methods such as, for example, receiving a desired torque level from a user console of work machine 10, monitoring an overload condition on power source 12, receiving an increase speed request from an electronic control unit of work machine 10, or any other method for determining if an increase in torque output is required. For example, a desired torque output may be determined when selectively configurable electric motor 20 coupled to one or more traction devices 16 of work machine 10 is presented with an increased load (e.g., when work machine 10 is ascending a hill), while maintaining a constant speed. A desired torque output may be determined by controller 48 to accommodate the requested increase in load.

Actual torque output may be compared to desired torque output (Step 54) in order to determine if a change in output torque is required (Step 55). For example, during operation of selectively configurable electric motor 20, actual output torque and desired output torque may be continuously monitored and/or determined. Should the desired torque output exceed the actual torque output, the configuration of the field windings may be modified to accommodate the desired torque output (Step 56). Similarly, if an increase in speed is requested, and if the actual torque output exceeds the desired torque output by a predetermined limit, the field windings may be modified in order to accommodate the speed request.

Figure 6:
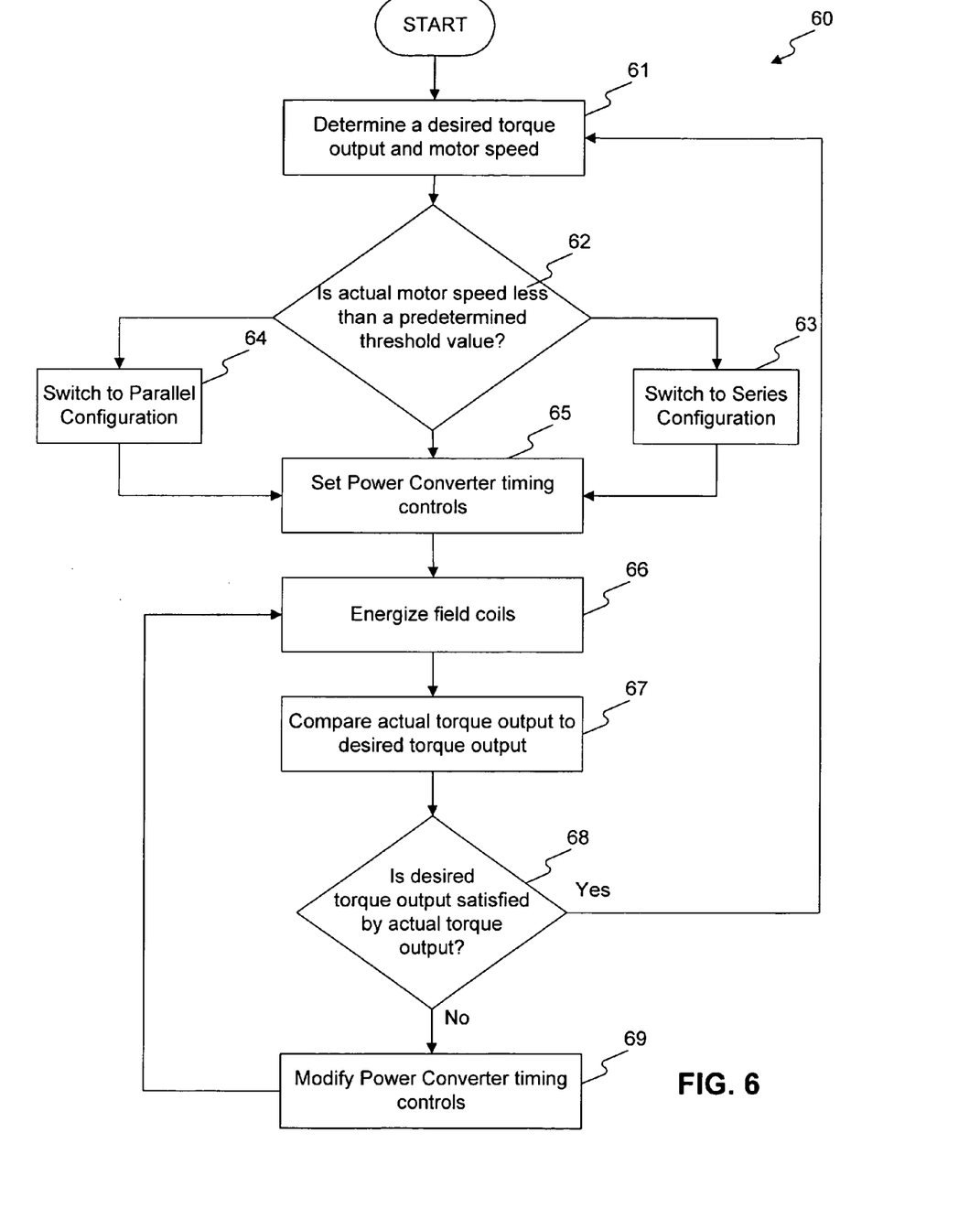
FIG. 6 illustrates a method for operating selectively configurable electric motor according to an exemplary disclosed embodiment.

FIG. 6 illustrates one exemplary method for operating selectively configurable electric motor 20, based on a desired torque output. During an operation of the motor (or at motor start-up), a desired torque output and motor speed may be determined (Step 61). For example, during a normal operation of selectively configurable electric motor 20, controller 48 may calculate a motor speed and torque output needed to respond to a request (e.g., engaging a throttle, depressing a gas pedal, etc.) by an operator of work machine 10. Controller may receive the request and, based on the type of request, determine a desired torque output and motor speed that may be needed to accommodate the request.

Controller 48 may determine that the actual motor speed is less than a predetermined threshold value (Step 62; Yes), indicating that selectively configurable electric motor 20 may be capable of providing additional torque output at the current speed range. Controller 48 may arrange power converter 42 in a series configuration to increase the maximum available torque output at the current speed. According to one exemplary embodiment, the threshold value may be a predetermined value stored in controller 48 to indicate a default speed for modifying the configuration of the motor between parallel and series configuration.

Similarly, controller 48 may determine that the actual motor speed is not less than the predetermined threshold value (Step 62; No), indicating that, for the current speed requirements of the motor, controller 48 may arrange power converter 42 in a parallel configuration to provide an increased torque output due to the elevated speed of selectively configurable electric motor 20.

Upon establishing the configuration of selectively configurable electric motor 20, controller 48 may set timing controls of power converter 42 (Step 65). For example, controller 48 may modify the timing characteristics associated with power converter 42 to control the operation of switching elements 44a-j to arrange electric conductors 29 according to the desired configuration, which may further maximize the torque output and speed capabilities of selectively configurable electric motor 20 for the particular configuration selected.

Once the timing has been selected, the field coils may be energized (Step 66) and the actual torque output may be compared to the desired torque output (Step 67). Should the desired torque output be satisfied by the actual torque output (Step 68; Yes) no additional modification of the motor operation may be required.

Alternatively, should the desired torque output not be satisfied by the actual torque output (Step 68; No), the power converter timing controls may be modified (Step 69) to "fine-tune" the output torque. In this case, the field coils may be energized (Step 66) based on the modification of the timing controls. Steps 66-69 may be repeated as a process loop until the desired torque output is satisfied by the actual torque output.

Because each of electric conductors 29 associated with poles 28 of stator 22 are individually configurable, selectively configurable electric motor 20 may provide increased torque output over a wider range of speeds than conventional motors. For example, electric conductors 29 of selectively configurable electric motor 20 may be electrically configured to provide sustained levels of torque output at increased speeds, without requiring the torque/speed tradeoff typically associated with industrial motors.

In addition, by providing fast, easily configurable electric conductors 29, selectively configurable electric motor 20 may increase productivity of work machine 10. For example, because configuration of electric conductors 29 may be modified electronically by controller 48, mechanical modifications to selectively configurable electric motor 20 can be significantly reduced, requiring less work machine downtime associated with maintenance and customization, thereby increasing work machine productivity.

Selectively configurable electric motor 20 may reduce manufacturing costs. For example, because each of electric conductors 29 is electronically configurable by controller 48 and power converter 42, the need for separate winding configurations and/or labor intensive mechanical taps may be reduced or eliminated, thereby reducing the time and labor intensive manufacturing processes associated with custom motor designs. Furthermore, because selectively configurable electric motor 20 may be configured electronically, re-configuring the operation of the motor may be performed without mechanically breaking down the motor, as in conventional motor designs.

It will be apparent to those skilled in the art that various modifications and variations can be made to the disclosed selectively configurable electric motor without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A selectively configurable electric motor, comprising:
   a stator;
   a plurality of poles electrically coupled to the stator;
   an actuator separated from the poles by an air gap and configured to move relative to the stator in the presence of an electromagnetic field;
   a plurality of electric conductors, each of the plurality of electric conductors substantially wound around one of the plurality of poles;
   a power converter, at least a portion of which is coupled to the plurality of electric conductors, comprising:
      a plurality of switching elements configured to selectively couple a first electric conductor of the plurality of electric conductors to a second electric conductor of the plurality of electric conductors and modify an impedance of one or more of the plurality of electric conductors.

2. The electric motor of claim 1, wherein the plurality of switching elements are configured to selectively couple the first electric conductor and the second electric conductor in a series arrangement and a parallel arrangement.

3. The electric motor of claim 2, wherein the plurality of switching elements are further configured to selectively couple the first electric conductor and the second electric conductor in a combination series/parallel arrangement.

4. The electric motor of claim 1, further including a controller configured to operate the power converter based on a desired torque output.

5. The electric motor of claim 1, further including a controller configured to operate the power converter based on a desired actuator speed.

6. The electric motor of claim 1, wherein the power converter includes one or more electrical devices for selectively energizing the plurality of electric conductors.

7. The electric motor of claim 1, wherein the actuator includes a rotor.

8. The electric motor of claim 1, wherein the actuator includes a linear motive device.

9. The electric motor of claim 1, wherein the actuator includes a metallic core.

10. The electric motor of claim 2, wherein the plurality of switching elements are configured to switch an electrical configuration of the first electric conductor and the second electric conductor between a series arrangement and a parallel arrangement during operation of the electric motor.

* * * * *